(No Model.)
A. C. WILLATS.
FILTER.
No. 604,950. Patented May 31, 1898.
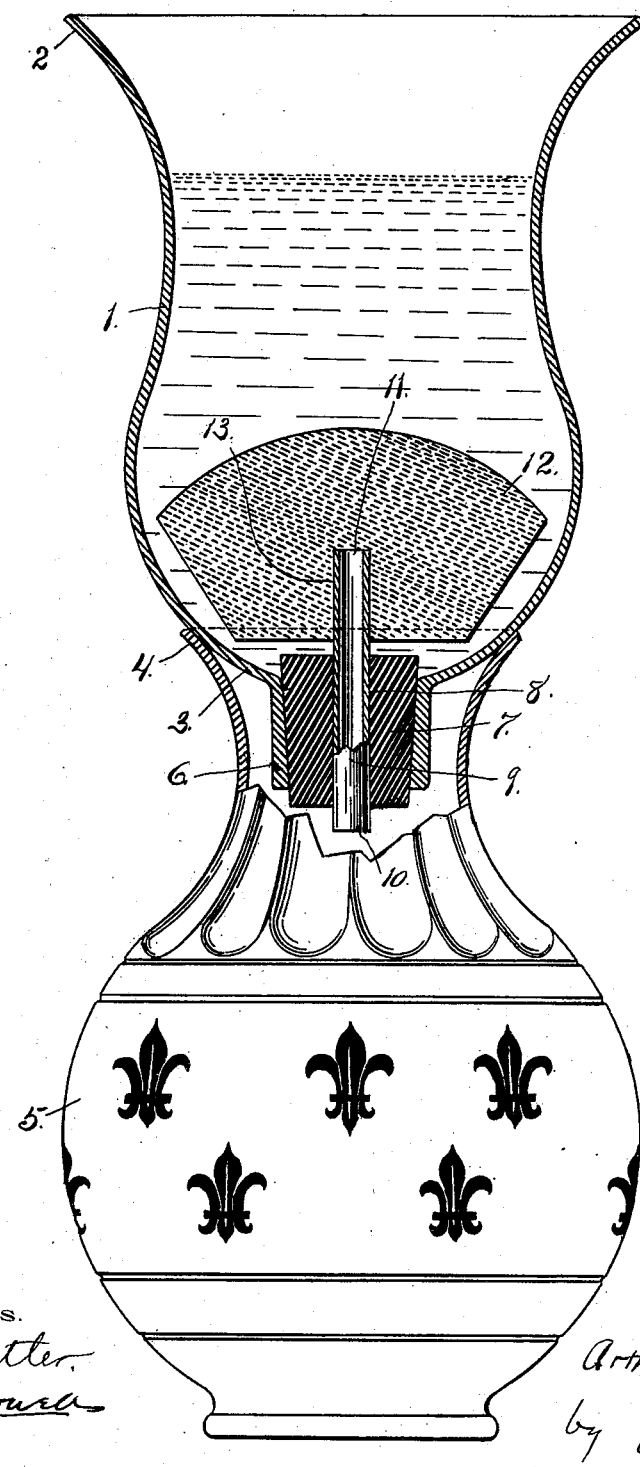
Witnesses.
C. B. Butter
Q. H. Crouse
Inventor.
Arthur C. Willats
by W. T. Miller
Attorney.

UNITED STATES PATENT OFFICE.

ARTHUR C. WILLATS, OF BUFFALO, NEW YORK.

FILTER.

SPECIFICATION forming part of Letters Patent No. 604,950, dated May 31, 1898.

Application filed August 14, 1897. Serial No. 648,209. (No model.)

*To all whom it may concern:*

Be it known that I, ARTHUR C. WILLATS, a citizen of the United States, residing at Buffalo, in the county of Erie and State of New York, have invented certain new and useful Improvements in Filters; and I do hereby declare the following to be a full, clear, and exact description of the invention, such as will enable others skilled in the art to which it appertains to make and use the same, reference being had to the accompanying drawing, and to figures of reference marked thereon, which forms a part of this specification.

My invention relates to improvements in filters, its object being to provide one of a light portable nature adapted chiefly for use at the table during meals, whereby a small quantity of water can be filtered directly into a carafe or water-bottle, as needed.

To this end my invention consists in the details of construction, as hereinafter more fully described and claimed, and as illustrated in the accompanying drawing, wherein the figure represents in central vertical section my improved filtering device resting upon a carafe or water-bottle.

Referring to the drawing, 1 is the vessel for the reception of the impure water to be filtered. It is preferably constructed of glass and has the open flaring or bell-shaped top 2. Its bottom 3 is rounded, adapting it to rest in an upright position upon the neck 4 of the carafe or water-bottle 5, which is to receive the filtered water.

6 is a downwardly-projecting spout having a passage centrally arranged upon the bottom 3 of the receiving vessel, its sides tapering inwardly from its upper end to adapt it for the reception of the tapered stopper 7, which is tightly and removably secured in such passage from above. This stopper is preferably made of rubber or other analogous composition and is provided with a central vertical duct 8. A glass tube 9 is removably secured in this duct 8, its lower open end 10 projecting below the stopper a short distance and its upper open end 11 projecting for a considerable distance above the stopper 7. A rigid block 12 of porous filtering material, preferably of charcoal and of less diameter than the vessel 1, is provided, and is rounded on its upper side, while in its under side it has a vertical cylindrical recess 13, centrally placed and adapted for the reception of the upper projecting end 11 of the conducting-tube 9. The block 12 of filtering material is removably mounted on this tube, and is thereby supported in position above the bottom of the receiving-chamber and out of contact with the sides thereof.

In operation the impure water is poured into the receiving vessel 1 onto the block 12, from whose rounded upper side it runs off, together with what impurities it may contain. The space between the sides of the vessel 1 and the block 12 of filtering material permits a considerable quantity of the sediment in the water to settle to the bottom and in the vessel without contact with the charcoal block. The water gradually percolates through the block 12, into and through the tube 9, and passes into the upper open end 11 of the tube 9, down which it passes into the carafe beneath. The impurities are caught and held by the charcoal block and the water which drops into the carafe is thoroughly filtered.

As will be seen, the parts of my improved filtering device are all separable and can be quickly taken apart for cleansing and as quickly assembled for the filtering operation.

The receiving vessel 1 and the carafe 5 are to be made of glass of graceful configuration, so as to present a sightly appearance when placed upon the table for use.

My improved filtering device as constructed is light and can be moved or carried with perfect ease. It is always ready for use not only upon the dining-table, but in a sleeping-room or sick-room as well. It can be kept clean and pure with perfect ease and is perfectly adapted to take the place of any of the filters now in use, with a material saving in original cost as well as maintenance.

I claim—

The herein-described filtering device, the same comprising a receiving vessel having an opening in its bottom, a tube passing through said opening, means for closing the latter around the tube, and a filtering-block rounded on its upper side and provided with a cylindrical recess extending part way into its body from the lower side and mounted on the upper end of said tube, the recess being of such depth and the block of such size and shape that the latter stands out of contact with all parts of the device except said tube, as and for the purpose set forth.

In testimony whereof I have signed my name to this specification in the presence of two subscribing witnesses.

ARTHUR C. WILLATS.

Witnesses:
C. B. BUTLER,
W. T. MILLER.